2,774,789 l-ARTERENOL AND ITS ACID-ADDITION SALTS AND PREPARATION THEREOF

Benjamin F. Tullar, East Greenbush, N. Y., assignor to Sterling Drug Inc., Wilmington, Del., a corporation of Delaware No Drawing. Application October 24, 1947, Serial No. 782,012

10 Claims. (Cl. 260—570.6)

This invention relates to optically active forms of arterenol and to their preparation.

dl - Arterenol, alpha - aminomethyl - 3,4 - dihydroxybenzyl alcohol, is a potent synthetic sympathomimetic amine which is even more active physiologically than is l-epinephrine. Compared to l-epinephrine as a standard, dl-arterenol is about twice as effective a cardiac stimulant as it is a pressor agent (Crismon and Tainter, J. Pharmacol. and Exper. Therap., 62, 189–227 (1938). Its synthesis was carried out by Stolz and Flaecher over forty years ago, shortly after the first synthesis of dl-epinephrine, but all attempts to resolve it have been unsuccessful. This failure is especially surprising in view of the fact that dl-epinephrine was resolved by Flaecher in 1908. The close relationship between the two compounds is readily apparent from a comparison of the structural formulas:

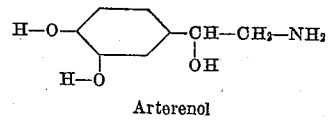
Arterenol

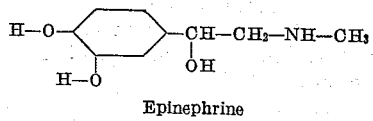
Epinephrine

The pharmacological testing, and hence the pharmaceutical utilization, of arterenol has been greatly hampered by this unavailability of the optically active forms; in this respect cf. Greer et al., J. Pharmacol. and Exper. Therap., 62, 189–227 (1938) and Crismon and Tainter (loc. cit.).

The unsuccessful results obtained by previous investigators in attempts to resolve dl-arterenol can possibly be attributed to the susceptibility of the alcoholic hydroxyl group to etherification by alcoholic solvents in the presence of acid, or to other and obscure causes. Regardless of the actual causal factors, the chief difficulty involved is gum formation in the preparation of the diastereoisomeric salts.

I have now succeeded in resolving dl-arterenol into its optically active d- and l-forms, thus for the first time making these isomers available for therapeutic use. Broadly, the process which I employ comprises treating dl-arterenol with an optically active tartaric acid, malic acid, or N-benzoyl-threonine to produce a mixture of diastereoisomeric salts, separating these salts by fractional crystallization, and releasing each of the desired isomers, i. e. d-arterenol and l-arterenol, from the separated amine salts. An important feature of the invention is the differing nature of the two diastereoisomeric salts with a given form of an optically active acid. In the presence of sufficient water, the salts of l-arterenol with d-tartaric acid, l-malic acid, and N-benzoyl-l-threonine will each form a hydrate which is less soluble in water and more soluble in methyl and ethyl alcohols than is the corresponding anhydrous d-arterenol salt. d-Arterenol does not form a salt hydrate with d-tartaric acid, l-malic acid, or N-benzoyl-l-threonine under these conditions. In complementary fashion, l-arterenol yields anhydrous salts with l-tartaric acid, d-malic acid, and N-benzoyl-d-threonine, while with these same acids d-arterenol forms hydrated salts. The formation of the hydrate by only one of the two diastereoisomeric forms affords a favorable solubility differential between the l-arterenol salt and the d-arterenol salt, thus permitting their separation by fractional crystallization. d-Arterenol and l-arterenol are then obtained by treating the separated salts with a base, e. g. ammonia.

Salts of l-arterenol with d-tartaric acid, l-malic acid, and N-benzoyl-l-threonine and of d-arterenol with l-tartaric acid, d-malic acid, and N-benzoyl-d-threonine readily form the requisite hydrate in the presence of water alone, or in the presence of organic solvents containing as much as about 5% water, e. g. ethanol- or methanol-water mixtures. Of these optically active acids, I prefer to use d-tartaric acid since this acid is cheaper than the others and it produces salts which are readily crystallized. From a concentrated aqueous solution of dl-arterenol with an equimolar amount of d-tartaric acid, crude l-arterenol acid d-tartrate monohydrate crystallizes in about 80% of the theoretical quantity. When 94% methanol is used as the solvent, crude d-arterenol acid-d-tartrate is obtained in about 80% yield. Thus, by alternate use of these two solvents, I can effect a nearly quantitative separation of the two isomers.

If it is desired to obtain one form of optically active arterenol at the expense of the other, it is desirable to racemize the less desired form. In this way the resultant dl-form can then be employed in the resolution process to obtain a further yield of the preferred isomer. The racemization process is readily carried out by heating an aqueous solution of the optically active form of arterenol with a strong mineral acid, such as hydrochloric acid.

By direct interaction of the acid and base, there are obtained therapeutically-useful salts of l-arterenol and d-arterenol with non-toxic inorganic and organic acids, such as hydrochloric acid, hydrobromic acid, sulfuric acid, phosphoric acid, tartaric acid, citric acid, succinic acid, and the like.

My invention is illustrated by the following example without, however, being limited thereto.

Example

A. *Preparation of l-arterenol.*—169 g. of pure dl-arterenol, M. P. 190–191° C., and 155 g. of d-tartaric acid are dissolved in 300 ml. of de-ionized water and the solution is cooled to 5° C. Crude l-arterenol acid d-tartrate monohydrate crystallizes heavily during two hours at 0–5° C., during which time the solution is stirred. The crystals are collected on a filter, and are then washed with 30 ml. of ice water and with two 100 ml. portions of 95% ethanol. The combined filtrates and washings are retained for part B. The solid is then dried in air. There is thus obtained 135 g. of l-arterenol acid d-tartrate monohydrate, M. P. 88–95° C. This product is dissolved in 100 ml. of de-ionized water at 50° C., and charcoal is added to the solution, which is then filtered. The residue on the filter is washed with 25 ml. of hot water and the combined filtrates are cooled to 0° C. After several hours, the solid which precipitates is collected on a filter, and is washed with 10 ml. of ice water and then with 95% ethanol. The combined filtrates and washings are retained for part B. The washed solid is dried, thus yielding 88 g. of nearly pure product, M. P. 94–98° C., which is further purified by recrystallization from an equal weight of water. There is thus obtained 60–85 g. of pure l-arterenol acid d-tartrate monohydrate, M. P. 102–104.5° C., $[\alpha]_D^{25-29°\ C.}$ —10.7° (1.6% soln. in water). To remove the water of hydration, if desired, one part of the hydrate is dissolved in 10 parts of methanol, preferably at 35° C., and the solution is allowed to stand at room temperature for several hours. The solid which crystallizes during this time is then collected on a filter, is washed with methanol and ether, and is dried at reduced pressure. There is thus obtained l-arterenol acid d-tartrate, M. P. approximately 160° C. l-Arterenol is prepared by dissolving 1 part of an l-arterenol salt, e. g. the acid d-tartrate, in 10 parts of water, and making the solution alkaline by adding 0.5 part of concentrated ammonium hydroxide, preferably at 10–15° C. On standing, l-arterenol separates from the solution. This solid is collected on a filter, is washed with water, methanol, and ether, and is dried at reduced pressure. There is thus obtained 0.5 part of l-arterenol, M. P. 216.5–218° C., $[\alpha]_D^{25-9°\ C.}$ —37.3° (5% soln. in dilute hydrochloric acid). This base reacts with acids in conventional manner to yield salts: e. g. l-arterenol sulfamate, M. P. 105–107° C.; l-arterenol sulfate, M. P. 90–94° C.; l-arterenol hydrochloride, M. P. 146.5–147.5° C. and $[\alpha]_D^{25-9°\ C.}$ —39° (6% soln. in water); and l-arterenol d-malate, M. P. 160–162° C.

B. *Preparation of d-arterenol.*—The two portions of filtrates and washings retained from the crystallizations in part A are combined and concentrated to dryness at reduced pressure. The residue thus obtained is dissolved in 200 ml. of 50% methanol at 50–60° C. To the clear solution is added 1500 ml. of methanol. This solution is allowed to stand at 25° C. for several hours with occasional scratching and stirring. A mass of crystals precipitates. This solid is collected on a filter, and is washed well with methanol. The combined filtrate and washings are retained for part C. The solid is dried in air. There is thus obtained 100–110 g. of d-arterenol acid d-tartrate, M. P. 161–165° C. If desired, this product can be purified by recrystallization from 94% methanol. The pure compound melts at 164–165° C., and has $[\alpha]_D^{25-9°\ C.}$ —39.9° (1.6% soln. in water). d-Arterenol, M. P. 216–217° C., $[\alpha]_D^{25-9°\ C.}$ —37.4°. (1.6% soln. in water), is obtained by adding ammonium hydroxide to an aqueous solution of a d-arterenol salt, using a procedure analogous to that employed in part A for l-arterenol. Salts of this base are obtained in the usual manner by interaction with acids; for example: d-arterenol hydrochloride, M. P. 146–147° C.; d-arterenol N-benzoyl-l-threonine, M. P. 110–112° C.; and d-arterenol l-malate, 160–162° C.

C. *Recovery of isomers from mother liquors.*—The filtrate and washings retained in part B are evaporated to dryness at reduced pressure. The residue, which is an approximately 1–1 mixture of l-arterenol acid d-tartrate monohydrate and d-arterenol acid d-tartrate, is dissolved in 150 ml. of water and the solution is cooled to 0° C. for several hours. A second crop of nearly pure l-arterenol acid d-tartrate monohydrate weighing 30 g. is thus obtained. From the mother liquor a second crop of d-arterenol acid d-tartrate, weighing 25 g. and melting at 160–165° C., is obtained by repetition of the procedure described in part B.

D. *Racemization of the d-arterenol.*—120 g. of d-arterenol is dissolved in 1 liter of de-ionized water and 100 ml. of concentrated hydrochloric acid (previously boiled for about thirty minutes to expel dissolved air). The solution is allowed to stand at 80–90° C. for two hours, excluding air by means of a stream of nitrogen. The solution is cooled to 10° C. and is then made alkaline by adding 80 ml. of concentrated ammonium hydroxide. The alkaline solution is allowed to stand at 10° C. for one hour, during which time dl-arterenol crystallizes. The solid is collected on a filter, is washed with two 100 ml. portions of water and then with methanol and ether, and is then dried at reduced pressure. There is thus obtained 100 g. of dl-arterenol, M. P. 189–191° C.

It will be understood that when, in the above example, there is used as the solvent 94% methanol instead of water, d-arterenol d-tartrate separates from the solution of the dl-mixture, and the l-arterenol d-tartrate remains in solution, from which solution it is isolated by removing the solvent and fractionally crystallizing the residue.

I claim:

1. A substance selected from tthe group consisting of l-arterenol and its acid-addition salts, said substance being in crystalline and substantially pure form and being substantially free from its optical antipode.

2. l-Arterenol in crystalline and substantially pure form and substantially free from its optical antipode.

3. An acid addition salt of l-arterenol, said salt being in crystalline and substantially pure form and being substantially free from its optical antipode.

4. l-Arterenol hydrochloride in crystalline and substantially pure form and substantially free from d-arterenol hydrochloride.

5. l-Arterenol acid d-tartrate in crystalline and substantially pure form and substantially free from d-arterenol acid d-tartrate.

6. The process for obtaining l-arterenol which comprises: treating dl-arterenol with an optically active acid selected from the group consisting of tartaric acid, maleic acid, and N-benzoyl-threonine in the presence of an organic solvent containing at least 5% of water; separating the diastereoisomeric salts thus formed by fractional crystallization; and regenerating l-arterenol from the separated salt of l-arterenol.

7. The process for obtaining l-arterenol which comprises: racemizing d-arterenol by heating it with mineral acid; treating the dl-arterenol thus obtained with an optically active acid selected from the group consisting of tartaric acid, malic acid, and N-benzoyl-threonine in the presence of a solvent containing at least 5% of water; separating the diastereoisomeric salts thus formed by fractional crystallization; and regenerating each of the two isomers, d-arterenol and l-arterenol, from the separated amine salts.

8. The process for resolving dl-arterenol which comprises: treating dl-arterenol with an optically active acid selected from the group consisting of tartaric acid, malic acid, and N-benzoylthreonine in the presence of a solvent containing at least 5% of water; separating the diasteoisomeric salts thus formed by fractional crystallization; and regenerating each of the two isomers, d-arterenol and l-arterenol, from the separated amine salts.

9. The process for obtaining l-arterenol which comprises: racemizing d-arterenol by heating it with mineral acid; treating the dl-arterenol thus obtained with d-tartaric acid in the presence of a solvent containing at least 5% of water; separating the disastereoisomeric salts thus formed by fractional crystallization; and regenerating each of the two isomers, d-arterenol and l-arterenol, from the separated amine salts.

10. The process for resolving dl-arterenol which comprises: treating dl-arterenol with d-tartaric acid in the presence of a solvent containing at least 5% of water; separaing the diastereoisomeric salts thus formed by fractional crystallization; and regenerating each of the two isomers, d-arterenol and l-arterenol, from the separated amine salts.

References Cited in the file of this patent

UNITED STATES PATENTS

| | | |
|---|---|---|
| 862,675 | Stolz et al. | Aug. 6, 1907 |
| 1,044,778 | Gruttefien | Nov. 19, 1912 |

(Other references on following page)

UNITED STATES PATENTS

| | | |
|---|---|---|
| 1,934,015 | Stolz et al. | Nov. 7, 1933 |
| 2,047,144 | Kharasch | July 7, 1936 |

FOREIGN PATENTS

| | | |
|---|---|---|
| 3,021 | Great Britain | 1909 |
| 64,796 | Austria | Aug. 15, 1914 |
| 396,551 | Great Britain | Aug. 10, 1933 |
| 396,951 | Great Britain | Aug. 17, 1933 |
| 639,126 | Germany | May 16, 1935 |

OTHER REFERENCES

Karrer: "Org. Chem.," Nordemann Pub. Co., Inc., New York, N. Y., 1938, p. 91.

Gilman: "Org. Chem." (John Wiley and Sons, N. Y., 1938), pp. 190, 192.

Barger et al.: "Chem. Abst.," vol. 5, 109 (1911).

Greer et al.: J. Pharm. and Exp. Therap., 62, 189–227 (1937).

Drill: Pharmacology in Medicine (McGraw-Hill Book Co., Inc.), 1954, p. 26/2.

Goodman et al.: The Pharmacological Basis of Therapeutics (The MacMillan Co.), 1955, p. 500.